United States Patent
Chiu

(10) Patent No.: US 7,325,075 B1
(45) Date of Patent: Jan. 29, 2008

(54) METHODS FOR ADDRESS AND NAME DISCOVERY FOR ETHERNET ENTITIES

(75) Inventor: Ran-Fun Chiu, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 908 days.

(21) Appl. No.: 10/801,468

(22) Filed: Mar. 15, 2004

(51) Int. Cl.
G06F 15/16 (2006.01)
(52) U.S. Cl. ........................ 709/245; 709/227
(58) Field of Classification Search ............. 709/245, 709/227; 370/389, 392
See application file for complete search history.

(56) References Cited

U.S. PATENT DOCUMENTS

| | | | |
|---|---|---|---|
| 5,491,812 A | 2/1996 | Pisello et al. | |
| 5,642,337 A | 6/1997 | Oskay et al. | |
| 6,295,572 B1 | 9/2001 | Wu | |
| 6,330,615 B1 | 12/2001 | Gioquindo et al. | |
| 6,343,083 B1 | 1/2002 | Mendelson et al. | |
| 6,400,730 B1 | 6/2002 | Latif et al. | |
| 6,470,397 B1 | 10/2002 | Shah et al. | |
| 6,658,459 B1 | 12/2003 | Kwan et al. | |
| 7,203,954 B1 * | 4/2007 | Tsang et al. ............... | 725/111 |
| 2003/0026267 A1 | 2/2003 | Oberman et al. | |
| 2003/0112765 A1 * | 6/2003 | Gaspard et al. ............ | 370/252 |
| 2003/0118053 A1 | 6/2003 | Edsall et al. | |
| 2003/0187997 A1 * | 10/2003 | Alexis ........................ | 709/229 |
| 2004/0095897 A1 * | 5/2004 | Vafaei ........................ | 370/254 |

OTHER PUBLICATIONS

Ira Winston, Two Methods for the Transmission of IP Datagrams over IEEE 802.3 Networks, Request for Coments: 948, Network Working Group, Jun. 1985.

Julian Satran, Kalman, Meth, Costa, Sapuntzakis, Mallikarjun Chadalapaka, Efri, Zeidner, iSCSI, Internet Draft, work in progress, The Internet Society, IP Storage Working Group, Jan. 19, 2003.

National Committee for Information Technology Standards, X3T9.2 Task Group, Lawrence J. Lamers (editor), Information technology—Small Computer System Interface—2, Project 375D, Revision 10L, Working Draft, ANSI X3.131—199x, Sep. 7, 1993. < http://www.t10.org/ftp/t10/drafts/s2/s2-r101.pdf>.

National Committee for Information Technology Standards, T10 Technical Committee, SCSI Storage Interfaces, Ralph O. Weber (editor), Information technology—SCSI Architecture Model—2 (SAM-2), Project 1157-D, Revision 15, Nov. 9, 2000. < http://www.t10.org/ftp/t10/drafts/sam2/sam2r15.pdf>.

* cited by examiner

Primary Examiner—Krisna Lim

(57) ABSTRACT

The present invention provides methods for address and name discovery for Ethernet entities. In one aspect, a method is provided for discovering an Ethernet address of a target device in a network having a plurality of devices. The method uses a device name of the target device. A broadcast Ethernet packet includes a source address field and a payload field, the source address field including an Ethernet address of an initiator and the payload field of the broadcast Ethernet packet includes the device name of the target device. The Ethernet packet is broadcast over the network to each device in the network including the target device. The broadcast Ethernet packet is ignored at the devices other than the target device. A response Ethernet packet is received from the target device. The response Ethernet packet includes a destination address field with the Ethernet address of the initiator. The response Ethernet packet also includes the Ethernet address of the target device. In another aspect, a method is provided for name discovery.

19 Claims, 15 Drawing Sheets

200

| Bit Byte | 7 | 6 | 5 | 4 | 3 | 2 | 1 | 0 |
|---|---|---|---|---|---|---|---|---|
| 0 | Operation Code (08h) (Read) ||||||||
| 1 | Logical Unit Number (LUN) ||| (MSB) |||||
| 2 | Logical Block Address ||||||||
| 3 | (LSB) ||||||||
| 4 | Transfer Length ||||||||
| 5 | Control ||||||||

FIG. 2

|  | Byte_0 | Byte_1 | Byte_2 | Byte_3 |
|---|---|---|---|---|
|  | rsv / I 0 / Opcode (0x01) | F R W rsv / 1 1 0 / ATTR 001 | reserved | |
| Byte_4 | TotalAHSLength (0) | | DataSegmentLength (0) | |
| Byte_8 | Logical Unit Number (LUN) | | | |
| Byte_12 | | | | |
| Byte_16 | Initiator Task Tag | | | |
| Byte_20 | Expected Data Transfer Length (in bytes) | | | |
| Byte_24 | CmdSN | | | |
| Byte_28 | ExpStatSN | | | |
| Byte_32 | SCSI Command Descriptor Block (CDB) | | | |
| Byte_44 | | | | |

| | Byte_0 | Byte_1 | Byte_2 | Byte_3 | |
|---|---|---|---|---|---|
| | Rsvd Opcode (ox25) | F A 0 0 0 U S | Reserved | Status or Rsvd | 504 |
| Byte_4 | TotalAHSLength (0) | | DataSegmentLength | | |
| Byte_8 | Logical Unit Number (LUN) or Reserved | | | | |
| Byte_12 | | | | | |
| Byte_16 | Initiator Task Tag | | | | |
| Byte_20 | Target Transfer Tag or oxffffffff | | | | |
| Byte_24 | StatSN or Reserved | | | | |
| Byte_28 | ExpCmdSN | | | | |
| Byte_32 | MaxCmdSN | | | | |
| Byte_36 | DataSN | | | | |
| Byte_40 | Buffer Offset | | | | |
| Byte_44 | Residual Count | | | | |
| Byte_48 | DataSegment | | | | |

FIG. 6

| Byte_0 | Byte_1 | Byte_2 | Byte_3 | |
|---|---|---|---|---|
| Rsvd | Opcode (0x10) | 1 | Rsvd | Reserved | |
| TotalAHSLength (0) | | DataSegmentLength (0) | | Byte_4 |
| Logical Unit Number (LUN) or Reserved | | | | Byte_8 |
| | | | | Byte_12 |
| Initiator Task Tag or 0xffffffff | | | | Byte_16 |
| Target Transfer Tag or 0xffffffff | | | | Byte_20 |
| Reserved | | | | Byte_24 |
| ExpCmdSN | | | | Byte_28 |
| Reserved | | | | Byte_32 |
| Reserved | | | | Byte_36 |
| BegRun | | | | Byte_40 |
| RunLength | | | | Byte_44 |

| Bit<br>Byte | 7 | 6 | 5 | 4 | 3 | 2 | 1 | 0 |
|---|---|---|---|---|---|---|---|---|
| 0 | Operation Code (08h) (write) ||||||||
| 1 | Logical Unit Number (LUN) ||| (MSB) |||||
| 2 | Logical Block Address ||||||||
| 3 | (LSB) ||||||||
| 4 | Transfer Length ||||||||
| 5 | Control ||||||||

FIG. 8

| | Byte_0 | Byte_1 | Byte_2 | Byte_3 |
|---|---|---|---|---|
| | Rsvd \| Opcode (0x05) | F | Reserved | |
| Byte_4 | TotalAHSLength (0) | | DataSegmentLength | |
| Byte_8 | Logical Unit Number (LUN) or Reserved | | | |
| Byte_12 | | | | |
| Byte_16 | Initiator Task Tag | | | |
| Byte_20 | Target Transfer Tag or 0xffffffff | | | |
| Byte_24 | Reserved | | | |
| Byte_28 | ExpStatSN | | | |
| Byte_32 | Reserved | | | |
| Byte_36 | DataSN | | | |
| Byte_40 | Buffer Offset | | | |
| Byte_44 | Reserved | | | |
| Byte_48 | DataSegment | | | |

1000

FIG. 10

METHODS FOR ADDRESS AND NAME DISCOVERY FOR ETHERNET ENTITIES

This application is related to U.S. application Ser. No. 10/801,434, filed (on the same day as this application), the entire contents of which are hereby incorporated by reference.

FIELD OF THE INVENTION

The present invention relates to the field of network communication protocols and more particularly to address and name discovery for Ethernet entities.

BACKGROUND OF THE INVENTION

In a typical data center, data communication equipment consists of two different types of networks. These include a Fibre Channel storage area network (SAN) and an Ethernet-based local area network (LAN). The Fibre Channel network employs SCSI protocol and is used for communications between host computer systems and storage devices, such as for the hosts to issue read and write requests to the storage devices and for storage devices to return responses to the requests. The Ethernet LAN employs Ethernet protocol and allows the hosts to communicate with each other within the data center and to communicate externally via one or more Internet protocol (IP) routers connected to the Ethernet LAN.

Because of its complexity, Fibre Channel networks have remained relatively expensive to implement. In contrast, the cost of implementing an Ethernet network has fallen, while performance of Ethernet networks has increased.

Recently, Internet SCSI (iSCSI) has been developed for storage area networks. The iSCSI protocol maps SCSI requests and responses to a group of Transmission Control Protocol/Internet Protocol (TCP/IP) connections or a session to function as a storage service delivery system. Thus, in accordance with iSCSI, packet data units (PDUs) are encapsulated in TCP/IP protocol packets. TCP/IP packets are then communicated via Ethernet or other data networks as the underlying communication medium. The PDUs carry command information (to instruct a storage device to read or write data) and data (the data read from or written to a storage device).

Unfortunately, the iSCSI protocol has a number of drawbacks. For example, errors are often introduced by hardware and software employed by conventional IP routers. The limited checksum error detection scheme of TCP, while sufficient for world wide web (WWW) and email type of end-to-end communications, it is not generally sufficient for storage system applications. Thus, a data digest is added to each PDU for further error checking using a cyclic redundancy check (CRC). This increases the complexity and cost to implement iSCSI.

In addition, at the sending end, TCP segmentation for iSCSI PDUs does not preserve their packet's boundaries. PDUs that are too long to fit into a single TCP packet are divided into smaller segments before being encapsulated into TCP packets, and because of this asynchronous segmentation, some of the TCP packets may contain a tail end of one iSCSI PDU and head end of another. At the receiving end, TCP packets may be received out of order, and some of them may have errors that require retransmission. Since all the identification and control information of a iSCSI PDU is in the header, these TCP segments must be stored in a temporary buffer until the entire iSCSI data is received and checked before it can be copied to the allocated SCSI buffer. Thus, each data packet requires two copy operations, one copy to the TCP temporary buffer, and one from TCP temporary buffer to the SCSI buffer.

Furthermore, to provide sufficient throughout, multiple TCP/IP connection sessions may be required, which adds to the traffic management and error recovery complexity. In addition, because iSCSI is IP based, any device on the Internet may access and alter the data on the iSCSI device. To prevent this, a sophisticated security scheme such IPsec must be incorporated, which not only increases the complexity but also impedes performance.

Therefore, what is needed is a communication technique for storage systems that minimizes or eliminates the aforementioned drawbacks. It is toward these ends that the present invention is directed.

SUMMARY OF THE INVENTION

The present invention provides methods for address and name discovery for Ethernet entities. In one aspect, a method is provided for discovering an Ethernet address of a target device in a network having a plurality of devices. The method uses a device name of the target device. A broadcast Ethernet packet includes a source address field and a payload field, the source address field including an Ethernet address of an initiator and the payload field of the broadcast Ethernet packet includes the device name of the target device. The Ethernet packet is broadcast over the network to each device in the network including the target device. The broadcast Ethernet packet is ignored at the devices other than the target device. A response Ethernet packet is received from the target device. The response Ethernet packet includes a destination address field with the Ethernet address of the initiator. The response Ethernet packet also includes the Ethernet address of the target device.

In another aspect, a method of discovering a device name of a target device in a network having a plurality of devices. The method uses an Ethernet address of the target device. A broadcast Ethernet packet includes a source address field and a payload field, the source address field including an Ethernet address of an initiator and the payload field of the broadcast Ethernet packet includes the Ethernet address of the target device. The Ethernet packet is broadcast over the network to each device in the network including the target device. The broadcast Ethernet packet is ignored at the devices other than the target device. A response Ethernet packet is received from the target device. The response Ethernet packet includes a destination address field and a payload field, the destination address field including the Ethernet address of the initiator and the payload field including the device name of the target device.

BRIEF DESCRIPTION OF THE DRAWINGS

FIG. 2 illustrates a read command descriptor block in accordance with an embodiment the present invention;

FIG. 3 illustrates a command packet data unit in accordance with embodiment the present invention;

FIG. 6 illustrates a data-in packet data unit in accordance with an embodiment of the present invention;

FIG. 7 illustrates a data acknowledgement packet data unit in accordance with an embodiment of the present invention;

FIG. 8 illustrates a write command descriptor block in accordance with an embodiment of the present invention;

FIG. 10 illustrates a data-out packet data unit in accordance with an embodiment of the present invention;

DETAILED DESCRIPTION OF A PREFERRED EMBODIMENT

The present invention provides a communication protocol for storage systems. Packet data units (PDU) that carry command information (e.g., to instruct a storage device to read or write data) and data (e.g., the data read from or written to a storage device) are encapsulated into Ethernet data packets and communicated via Ethernet data communication media. This new communication protocol is referred to herein as Ethernet-SCSI or "eSCSI."

Unlike the iSCSI protocol, the present invention does not utilize TCP/IP protocol. Rather, PDUs that are too long to fit into a single Ethernet data packet are divided into smaller segments and header information (referred to as a "eSCSI header") is added to each segment before the segment is encapsulated into an Ethernet data packet. As a result, the header information is correlated to the Ethernet data packet boundaries. Elimination of the TCP/IP layer avoids introduction of errors at the TCP/IP layer and thus allows the digest for each PDU to be omitted. Since each header contains the offset byte number and data length, the data can be copied to the allocated SCSI buffer directly. As a result, only a single buffering operation is required, and the eSCSI header is also used to identify and replace any lost packets. Error control is performed using the CRC value for each Ethernet packet to identify and replace corrupted data during this receiving operation.

The invention overcomes disadvantages of prior storage system networks, and particularly the iSCSI protocol, by requiring only a single buffering operation and by being less complex to implement.

Figure 1:
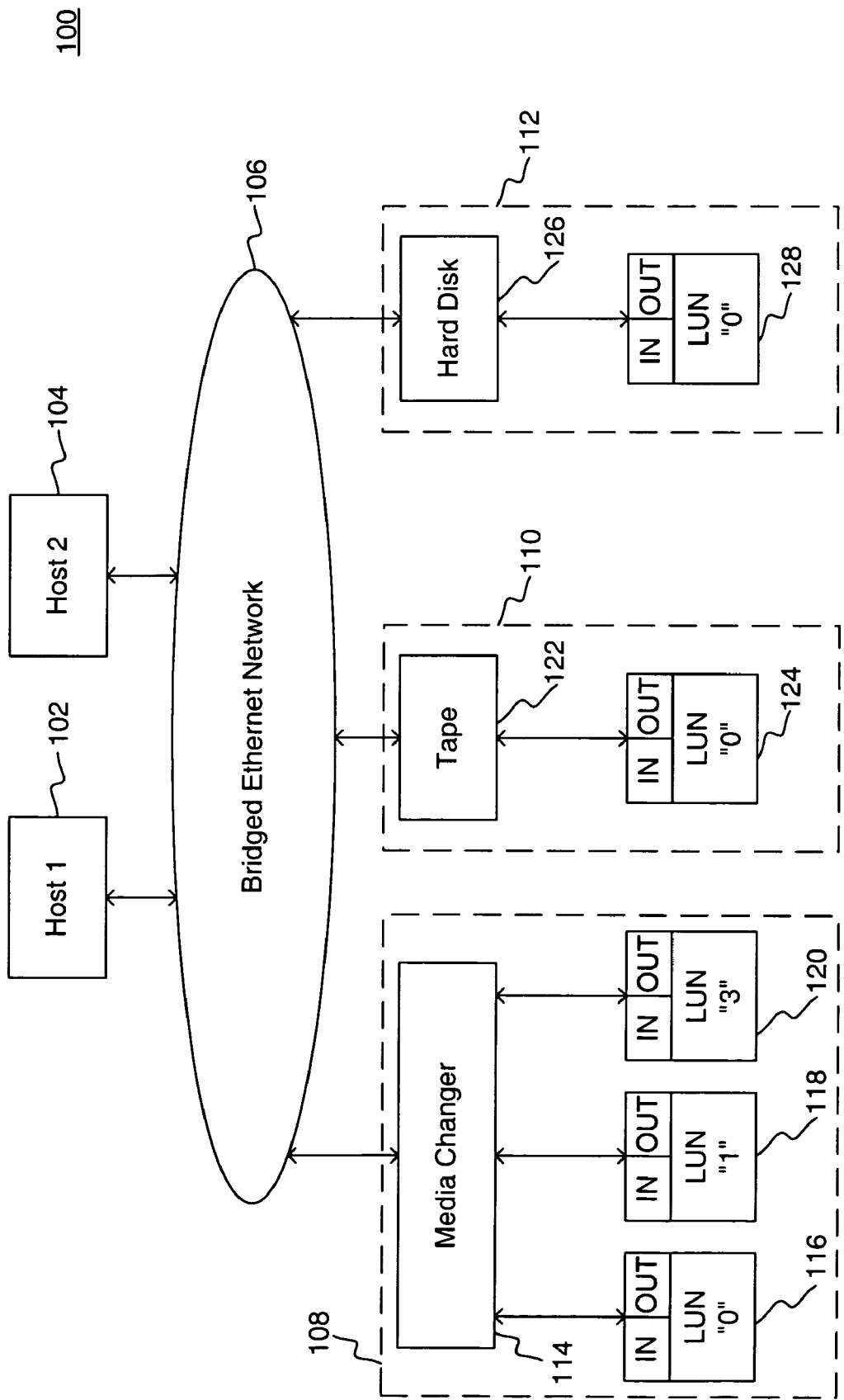
FIG. 1 illustrates an exemplary data storage system in accordance with an embodiment of the present invention.

FIG. 1 illustrates an exemplary data storage system 100 in accordance with an embodiment of the present invention. The data storage system 100 includes host computer systems 102 and 104, Ethernet communication media 106 and storage devices 108, 110, and 112. The host systems 102 and 104 initiate read and write storage transactions with the storage devices 108, 110, 112 and thus the host systems 102 and 104 are each referred to herein as an "initiator." The storage devices 108, 110 and 112 are each referred to herein as a "target." The communication media 106 generally includes network links and hardware devices, such as switches or hubs, in which case, the communication media 106 comprises a bridged Ethernet network. Data and commands described herein may be communicated via the Ethernet media 106 in accordance with 10 BASE-T, 100 BASE-TX or Gigabit Ethernet.

As shown in FIG. 1, the storage device 108 includes a media changer 114 and logical storage units (LUNs) 116, 118 and 120. The storage device 110 includes a tape drive 122 and LUN 124 while storage device 112 includes a disk drive and LUN 128. Data is stored in the physical storage media of each device 108, 110 or 112 and arranged according to the LUNs. Each LUN is identified by a unique number. Data to be stored in a LUN is buffered in input buffer for the LUN (labeled "IN") prior to storage, while data retrieved from the LUN is buffered in output buffer for the LUN (labeled "OUT") prior to delivery to the initiator that requested the data.

Storage devices 108, 110 and 112 are exemplary. As such it will be apparent that the storage system 100 may include any type of storage device, such as a hard disk drive, an optical disk drive, a disk array, a tape drive and so forth. In addition, while two host systems 102 and 104 and three storage devices 108, 110 and 112 are illustrated, it will be apparent that the system may include more or fewer hosts and may include more or fewer storage devices.

When it is desired for an initiator (e.g., host 102 or 104 of FIG. 1) to perform a storage transaction, the initiator forms an appropriate command descriptor block for the transaction in accordance with the small computer interface standards (SCSI) protocol. For example, to read a block of data from a target, the initiator forms a read command descriptor block (CDB). FIG. 2 illustrates a read CDB 200 in accordance with an embodiment the present invention. The read CDB 200 is preferably six bytes long (including bytes 0-5). Byte_0 includes an operation code value of 08 hexadecimal (ox08) to indicate that the command is for a read operation, and that it is a 6-byte command. The first three bits of byte_1 specifies which logical unit to read from, while the remainder of byte_1, byte_2 and byte_3 specify the address of the first logical block to be read from. Byte_4 specifies the total number of logical blocks to be read, while byte_5 includes a control field. Initiator also prepares to receive the requested data by allocating memory or storage for the data. The read CDB may be formed, for example, by an SCSI communication protocol of application of the initiator.

Based on the CDB, the initiator forms an eSCSI command packet data unit (PDU). For the read operation, the initiator forms an eSCSI command PDU based on the read CDB 200 of FIG. 2. FIG. 3 illustrates a read command PDU 300 in accordance with an embodiment the present invention. The read command PDU 300 preferably has a total length of 48 bytes and is similar to an iSCSI Basic Header Segment (BHS) but without the digest.

Referring to FIG. 3, the first bit of byte-0 is reserved; the second bit is an I-bit which indicates whether the PDU is for immediate delivery. In this case, the read command PDU 300 does not belong to this category; therefore, the I-bit is set to "0". The remaining 6 bits are allocated for opcode identification, which has a coded value of 01 hexadecimal (ox01) for SCSI commands.

Bit_0 of byte_1 is the final bit (F) which is set to "1" to indicate that no unsolicited data PDU is following the current PDU; bit_1, the read bit (R), is set to "1" to indicate a read command; bit_2, the write bit (W), set to "0", to indicate a non-write command; bit_3 and bit_4 are reserved; bit_5, bit_6 and bit_7 are for task attribute with a coded value of 001 binary to indicate a simple task. Byte_2 and byte_3 are reserved.

Byte_4 contains the total length of all additional header segments including padding in four byte words. For certain commands, additional header segments may be needed to carry CDB with lengths over 16 bytes and the expected bi-directional read data length for bi-directional data transfer. However, additional header segments are not needed for this read command. Thus, byte_4 is set to 0h.

Byte_5 to byte_7 contain the number bytes of data in the data field with the PDU. Since there is no data attached for the read command, it is set to 0h. Byte_8 to Byte_15 specify the logical unit number (LUN) that the command is addressed to, which for the read command, is the same LUN as is in the CDB 200 of FIG. 2. While the LUN of FIG. 2 is only three bits, in other circumstances, the LUN may be longer.

Byte_16 to byte_19 contain an initiator task tag. For commands other than chained commands, the command, its response and optional data phase form a task. The initiator assigns an identifier to the task which is placed in this field.

Byte_20 to byte_23 specify the number of bytes of data that is to be transferred in response to the command. This value can be determined by multiplying the transfer length in blocks from the CDB 200 by the number of bytes per logic block.

Byte_24 to byte_27 specify the command sequence number (CmdSN), which is increased by 1 for each command transmitted and thus serves as a reference number for error recovery.

Byte_28 to byte_31 specify the status sequence number (StatSN) of the next expected receiving eSCSI Response PDU or "ExpStatSN".

Byte_32 to byte_47 carry the SCSI Command Descriptor Block (CDB) 200 of FIG. 2. If a CDB has more than 16 bytes, the additional bytes are carried in an additional header segment; however, if the CDB is less than 16 bytes, it is padded to 16 bytes. In this example, the CDB 200 is six bytes long and thus has 10 bytes of padding.

Figure 4:
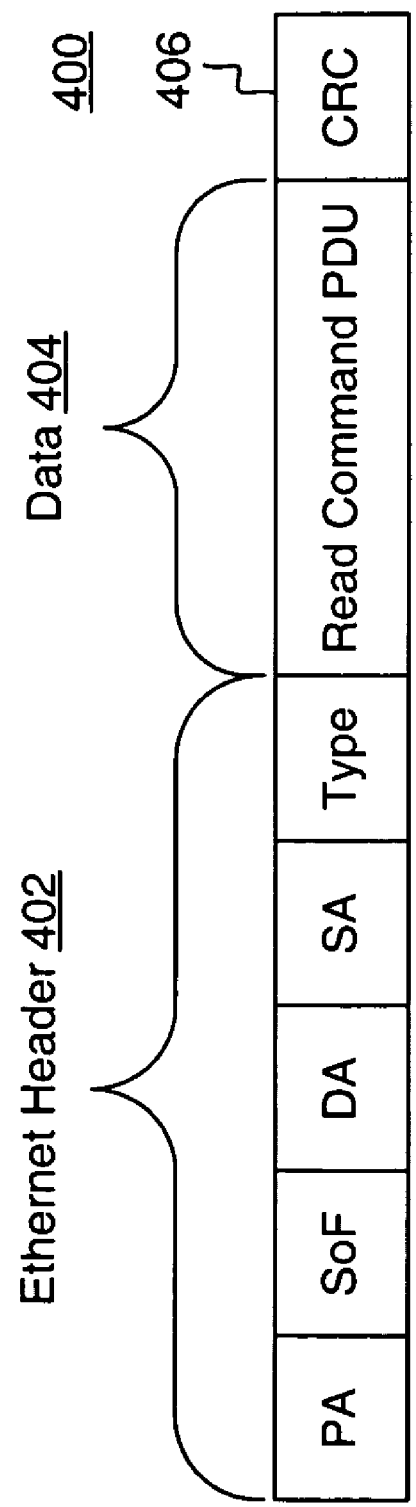
FIG. 4 illustrates an Ethernet data packet for a read command in accordance with an embodiment of the present invention.

The initiator then encapsulates the eSCSI command PDU into an Ethernet frame. For the read operation, the initiator encapsulates the eSCSI read command PDU 300 of FIG. 3 in an Ethernet frame. FIG. 4 illustrates an Ethernet data packet 400 in accordance with an embodiment of the present invention. The Ethernet data packet 400 includes a header portion 402, including a preamble, start-of-frame, source address, destination address and type. The source address is the Ethernet address for the initiator while the destination address is the Ethernet address for the target. The type field identifies the packet as carrying a SCSI command.

The Ethernet packet 400 also includes a data field, including the read command PDU 300 of FIG. 3. In addition, the Ethernet frame 400 includes a cyclic redundancy check (CRC) field for performing error control.

The initiator sends the read command PDU 300 encapsulated in the Ethernet frame 400 to the target and starts a retransmission counter. If the initiator does not receive an acknowledgment from the target before the expiration of the timer, it resets the timer and resends the encapsulated PDU again, until a maximum specified number of retries is reached, in which case, an error condition is reported.

Upon receiving the Ethernet frame 400, the target obtains the read command PDU 300 (FIG. 3) from the frame 400 and the CDB 200 (FIG. 2) from the PDU 300. The target retrieves the requested data from the addressed LUN of its storage medium. The requested data is buffered in an output buffer for the LUN in preparation for the target to send the data to the initiator.

When the requested data exceeds a certain size, this means that more than one Ethernet frame will be required to carry the data from the target to the initiator. Accordingly, the data is segmented so that each segment will fit within an Ethernet frame.

Figure 5:
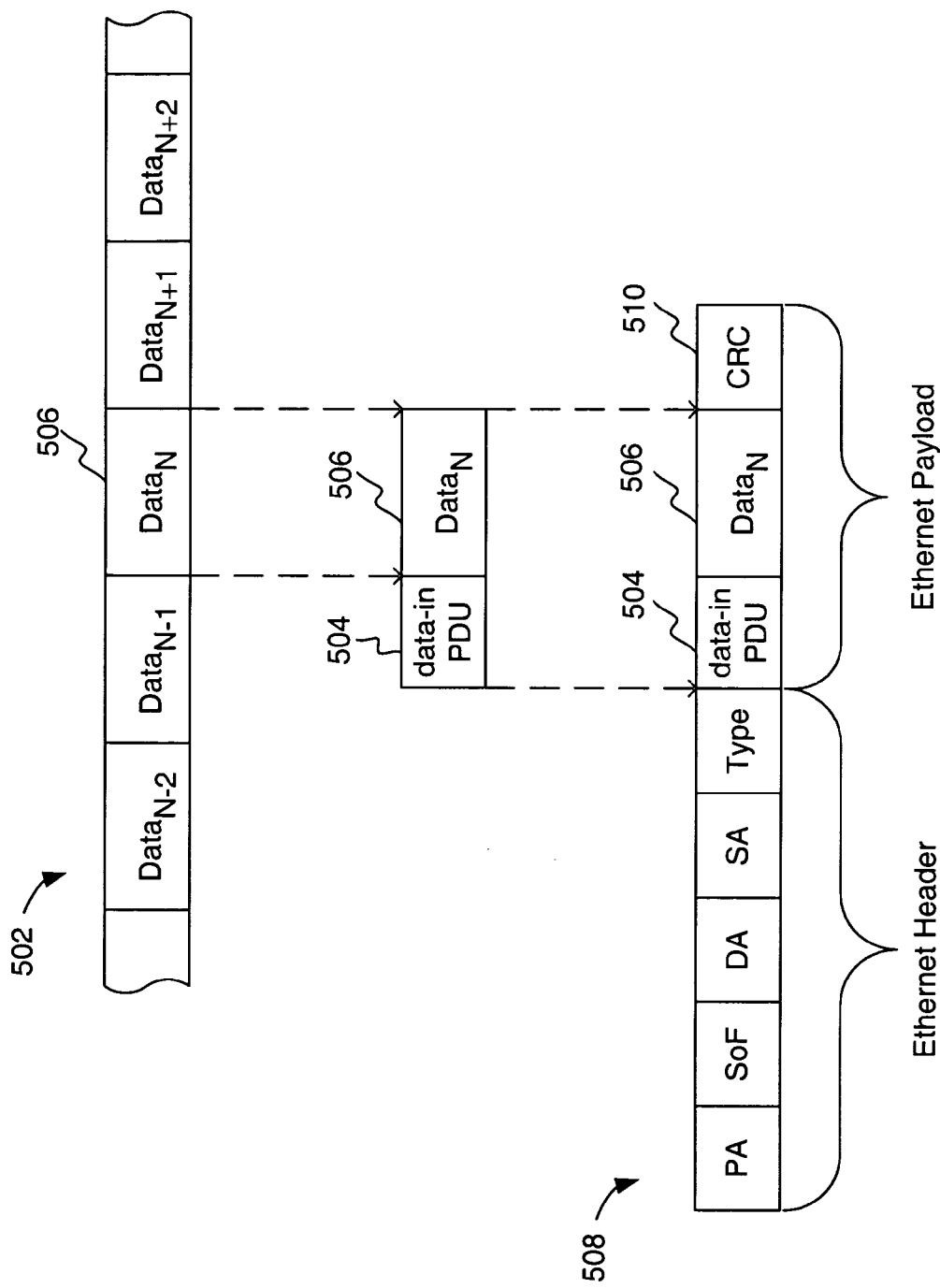
FIG. 5 illustrates data segmenting and transfer in accordance with an embodiment of the present invention.

FIG. 5 illustrates data segmenting and transfer in accordance with an embodiment of the present invention. FIG. 5 shows a portion of buffered data 502 requested by an initiator ("data-in") being divided at the target into sequential segments for forwarding to the initiator as follows: . . . , Data$_{N-2}$, Data$_{N-1}$, Data$_{N}$, Data$_{N+1}$, Data$_{N+2}$, . . . The target adds a data-in PDU 504 header to each segment 506. The data-in PDU 504 header and data segment are inserted into the payload of an Ethernet frame 508. Each Ethernet frame 508 includes a CRC checksum 510. The Ethernet frames 508 for a read operation are transmitted from the target identified by the source address in the Ethernet frame 508 to the initiator identified by the destination address in the Ethernet frame 508.

The data-in PDU 504 header is preferably 48 bytes long. Because the maximum payload for an Ethernet frame 508 is generally 1500 bytes, this leaves 1452 bytes for the data segment. Thus, the segments are preferably each of uniform length and the maximum length that the frame 508 can accommodate so that each is 1452 bytes long. The last segment for a request may be less than 1452 bytes. It will be apparent, however, that another length may be selected for the segments. For example, the data may be divided into uniform segments that are shorter than the maximum that an Ethernet frame will accommodate. Alternatively, the segments need not be of uniform length.

An aspect of this data segmenting and transfer in accordance with the present invention is that there is preferably one data segment 506 and one associated data-in PDU 504 header for each Ethernet frame 508. Accordingly, there is a correlation between data segments and Ethernet frames. As a result, the CRC 510 of the Ethernet frame is sufficient for controlling communication errors in the PDU 504 header and data segment 506. Thus, a digest for each PDU header and a digest for each data segment are not needed, unlike the conventional iSCSI protocol.

FIG. 6 illustrates a data-PDU header 504 in more detail in accordance with an embodiment of the present invention. The data-in PDU 504 includes an opcode value of 25 hexadecimal (ox25). There are several special function flag-bits in byte_1 which are explained below.

In its DataSegmentLength field, the number of bytes in the data segment 506 following the PDU 504 header is specified, while the Buffer Offset field of the PDU 504 header specifies the offset position of the current data segment 506 referenced to the beginning of the buffer. These offset and length values are used by the target to determine the position of a particular data segment 506 within the series of segments 502 (FIG. 5). The data-in PDU 504 header also includes a DataSN field, which specifies a sequence number of the Data-in PDU (header 504 and data 506) in the overall stream. Thus, the sequence number indicates the correct order of the data segments. However, since each PDU contains the data length and offset number for its own data segment, the data segment can be copied to the reserved SCSI buffer directly without waiting for the reception of data segments occurring earlier in the sequence.

The data-in PDU 504 header has the same value in its Initiator Task Tag field as the corresponding command PDU.

This identifies the original command to which the data-in PDU 504 header with its data segment is being sent in response.

The PDU 504 header specifies the highest CmdSN value plus one in its ExpCmdSN field to acknowledge all command PDUs up to the one with the highest CmdSN value. This information allows the initiator to determine whether the target has received all of the commands that the initiator sent to the target.

The target also sends the maximum acceptable command sequence number to the initiator in the MaxCmdSN field. This limits the outstanding commands that the initiator can send to the target to help ensure that the target's ability to response to commands is not exceeded in view of its limited buffer space and processing power.

The special function flag-bits in byte_1 are now discussed. F is the final bit, which is only set to 1 for the last Data-in PDU. When both F and S are set to 1, the status of the task is in byte_3, and a status sequence number for this status response is in the StatSN field (byte_24 to byte_27). In certain conditions, the expected data transfer length in the received read command may be different from the total number of bytes needed to be transferred in the LU's data buffer. In this case, the O bit is set to 1 when the expected data transfer length is too short, and the U bit is set to 1 when it is too long. The difference between the buffered data length and the expected transfer length is carried in the Residual Count field of the PDU 504 header.

If the target wants a positive acknowledgement for the data-in PDU from the initiator, the target sets A flag-bit to 1 and provides a valid LUN number and Target Transfer Tag in their respective fields. Otherwise, A is set to 0 and both LUN and Target Transfer fields are reserved.

When initiator receives data-in PDU with A=1, initiator sends data acknowledgement to the target. The data acknowledgement indicates to the target whether all of the numbered data-in PDUs up to the current one are received correctly or whether one or more are missing.

FIG. 7 illustrates a data acknowledgement PDU or sequence number acknowledgement (SNACK) PDU 700 in accordance with an embodiment of the present invention. The opcode is 10 hexadecimal (ox10). The final bit F is set to 1 while the Type field has a value of "2" to indicate that all of the numbered data PDUs up to the current one have been received correctly, while both TotalAHSLength and DataSegmentLength fields are set to 0. The SNACK PDU 700 includes the LUN and Target Transfer Tag values from the Data-in PDU 504 header. The Initiator Task Tag is set to the reserved value oxffffffff. The ExpStatSN field in the SNACK PDU 700 is updated to acknowledge newly arrived status response PDUs in the sequence. The BegRun field is set to the DataSN value for the next Data-in PDU in sequence, and the RunLength field is set to 0. The initiator encapsulates the SNACK PDU into an Ethernet frame and sends it to the target.

Upon receiving the Ethernet frames including the data-in PDUs, the initiator obtains the data payload from each (the payload includes data-in PDU 504 header and corresponding data segment). The initiator sends the data segment to the proper SCSI buffer locations basing on the offset and length field in the PDU 504 header, and record the DataSN to determine whether each member of the series was received according its ordered position in the series. For example, when an Ethernet frame is corrupted during transmission, this will be detected upon reception of the packet using the CRC; in which case, the Ethernet packet will be dropped. Data from dropped packets will be missing from the series.

For one or more data segments that are missing, the initiator determines the sequence number of the missing segments from the adjacent data segments and sends a message to the target requesting retransmission of the data segments. More particularly, the initiator sends the target a data SNACK PDU, requesting the retransmission of the lost data-in PDUs. In the header of the SNACK PDU, the type field has a type value "1" (rather than a value of "2" as in FIG. 7). In addition, the Begrun field specifies the sequence number (DataSN) of the first lost PDU, and the RunLength field specifies the number of lost PDUs. Thus, if more than one contiguous segment is missing, the RunLength can indicate the number of missing segments. Both the LUN and Initiator Task Tag field have the same values as in the referenced read command PDU, and the Target Transfer Tag is set to ffffffff hexadecimal (oxffffffff). The ExpStatSN field is also updated.

In response to the SNACK PDU, the target resends each requested PDU. The initiator obtains the data segments from the resent PDUs and sends them to the allocated SCSI buffer locations according the offset and length fields in each of the PDU header.

When the initiator requests retransmission the initiator preferably also starts a timer upon sending the SNACK PDU. If the timer expires before receiving the first PDU of the requested data, the initiator resets the timer, updates the ExpStatSN field and resends the SNACK PDU again until reaching the maximum retry number, in which case, the eSCSI entity informs the SCSI client that an error condition has occurred In some instances, the Ethernet communication media 106 may undergo hardware reconfiguration during the process of the target sending a series of data-in PDUs to the initiator. For example, a failure of a hardware device may result in a network reconfiguration, in which case frames in the same data-in sequence may be switched through different devices after the reconfiguration. Also, the addition of new hardware may result in a hardware reconfiguration. As a result, Ethernet frames may be received at the initiator in an order that differs from the order in which the frames were sent by the target.

When this occurs, the data-in PDU of an Ethernet frame that is delayed will appear as a hole in the received DataSNs and, thus, may prompt the initiator to send a SNACK PDU requesting retransmission of the data-in PDU of the delayed frame. When the target receives the SNACK PDU, the target will attempt to resend the data segment as described above. As a result, the initiator may eventually receive both the delayed frame and the resent frame. Based on its received DataSN record the initiator discards a later-received data-in PDU to avoid attempting to process duplicate data.

When it is desired for to perform a write operation, an initiator forms a write command descriptor block (CDB). FIG. 8 illustrates a write CDB 800 in accordance with an embodiment of the present invention. The write CDB 800 preferably has the same format as the read CDB 200 (FIG. 2) except that the operation code value is 0A hexadecimal (ox0A) to indicate that the command is for a write operation, and that it is a 6-byte command.

Based on the write CDB 800, the initiator forms a write command PDU. The format for the write PDU is preferably the same as that for the PDU 300 shown in FIG. 3 for a read operation, while values for fields of a write command PDU differ from those of the read command PDU. For example, the read (R) bit in byte_1 is set to 0 and the write (W) bit is set to 1.

Data sent out for a write operation ("data-out") can be solicited or unsolicited. When the addressed logical unit (LU) in the target has allocated buffer space to receive a portion or all of the data requested by a write command from the initiator, the target sends message to the initiator to inform the initiator that the LU is ready to receive a certain amount of data. Data sent with explicit clearance from the target is referred to as solicited data. Unsolicited data is sent without explicit clearance from the target and may be sent attached to the write command PDU or attached to data-out PDU(s) that immediately follow the write command.

If there is no unsolicited data-out PDU following the write command PDU, the final (F) bit is set to 1. Otherwise, if there is an unsolicited data-out PDU following the write command, the F bit is set to 0. The DataSegmentLength field specifies the number of bytes of unsolicited data attached to the write command PDU, if any. The maximum length of the unsolicited data may be negotiated upon establishing a communication session between the initiator and the target.

Figure 9:
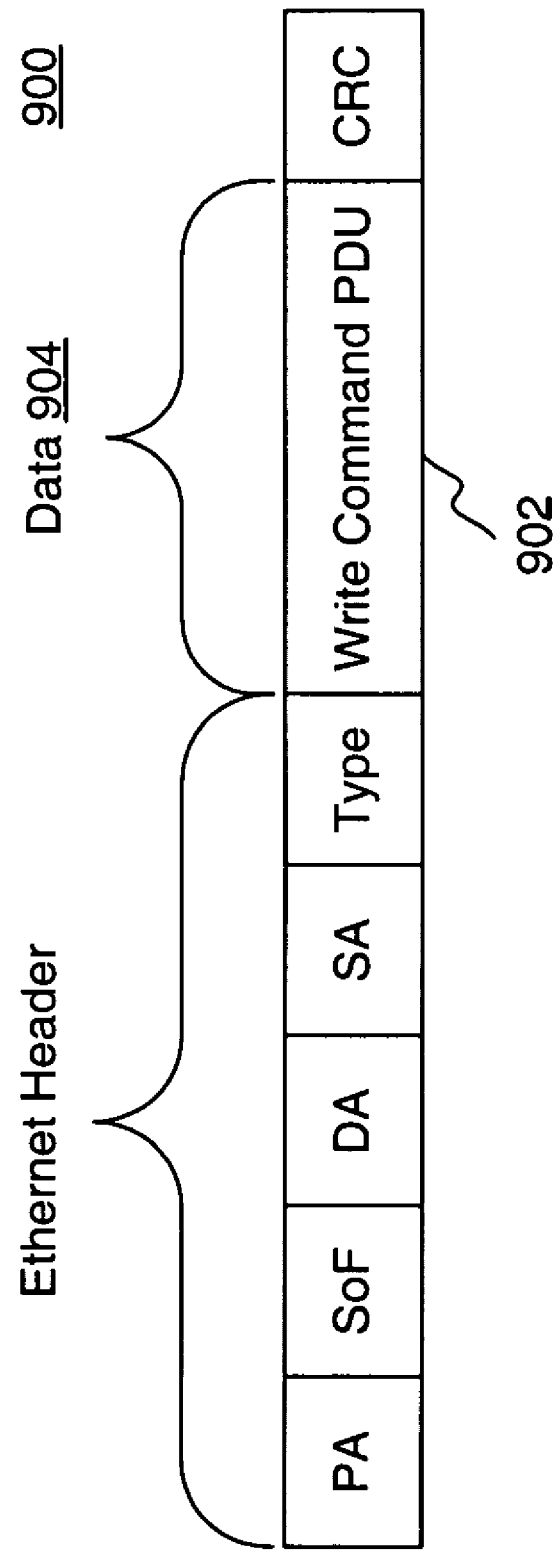
FIG. 9 illustrates an Ethernet data packet for a write command in accordance with an embodiment of the present invention.

The initiator encapsulates the write command PDU into an Ethernet frame and sends the encapsulated write command PDU to the target. FIG. 9 illustrates an Ethernet data packet 900 for a write command in accordance with an embodiment of the present invention. The Ethernet frame 900 of FIG. 9 has the same format as the Ethernet frame 400 of FIG. 4 except that it includes a write command PDU 902 in a data field portion 904 instead of a read command PDU. If unsolicited data is sent with the write command PDU 902, this data is included in the data field portion 904 of the frame 900.

The target obtains the write command PDU 902 and the write command CDB 800 from the received Ethernet frame 900. If unsolicited data is sent with the write command PDU, the target also obtains that data from the Ethernet frame 900 and places it into an input buffer for the specified LUN to which the data is to be written.

If unsolicited data is to be sent with data-out PDUs in Ethernet frames that immediately follow the frame 900 having the write command PDU 902, the initiator segments the data, forms appropriate data-out PDU header's and encapsulates each segment with a corresponding data-out PDU header into an Ethernet frame. Data segmenting and transfer was described herein in connection with FIG. 5; the difference for a write operation being that a data-out PDU is used in place of the data-in PDU 504 shown in FIG. 5. The Ethernet frames 508 for a write operation are transmitted from the initiator identified by the source address in the Ethernet frame to the target identified by the destination address in the Ethernet frame.

FIG. 10 illustrates a data-out PDU 1000 header in accordance with an embodiment of the present invention. For an unsolicited Data-out PDU 1000 header, the code for the Target Transfer Tag is ffffffff hexadecimal (0xffffffff), and the LUN field is the same as for the referenced write command PDU 902. The data-out PDU 1000 header includes offset and length values that can be used by the target to determine where to put the data segments in the LUN receiving buffer, a DataSN to determine any data-out PDUs missing from the sequence, as described above in reference to the read operation.

Upon receiving the Ethernet frames that include the unsolicited data-out PDU's 1000 header and data segment, the target performs error checking using the CRC from the Ethernet frames. Error checking may be performed by a network interface card (NIC) at the target. The target drops any frame that fails the CRC check and forwards frames that have passed the CRC check to the target's PDU processing entity, which places the data segments in an input buffer for the specified LUN to which the data is to be written.

If the write command PDU 902 specifies that no unsolicited data accompanies the command (because the final (F) bit is set to 1 and the DataSegmentLength field is set to 0) the initiator must await explicit clearance from the target before sending a data-out PDU.

Figure 11:
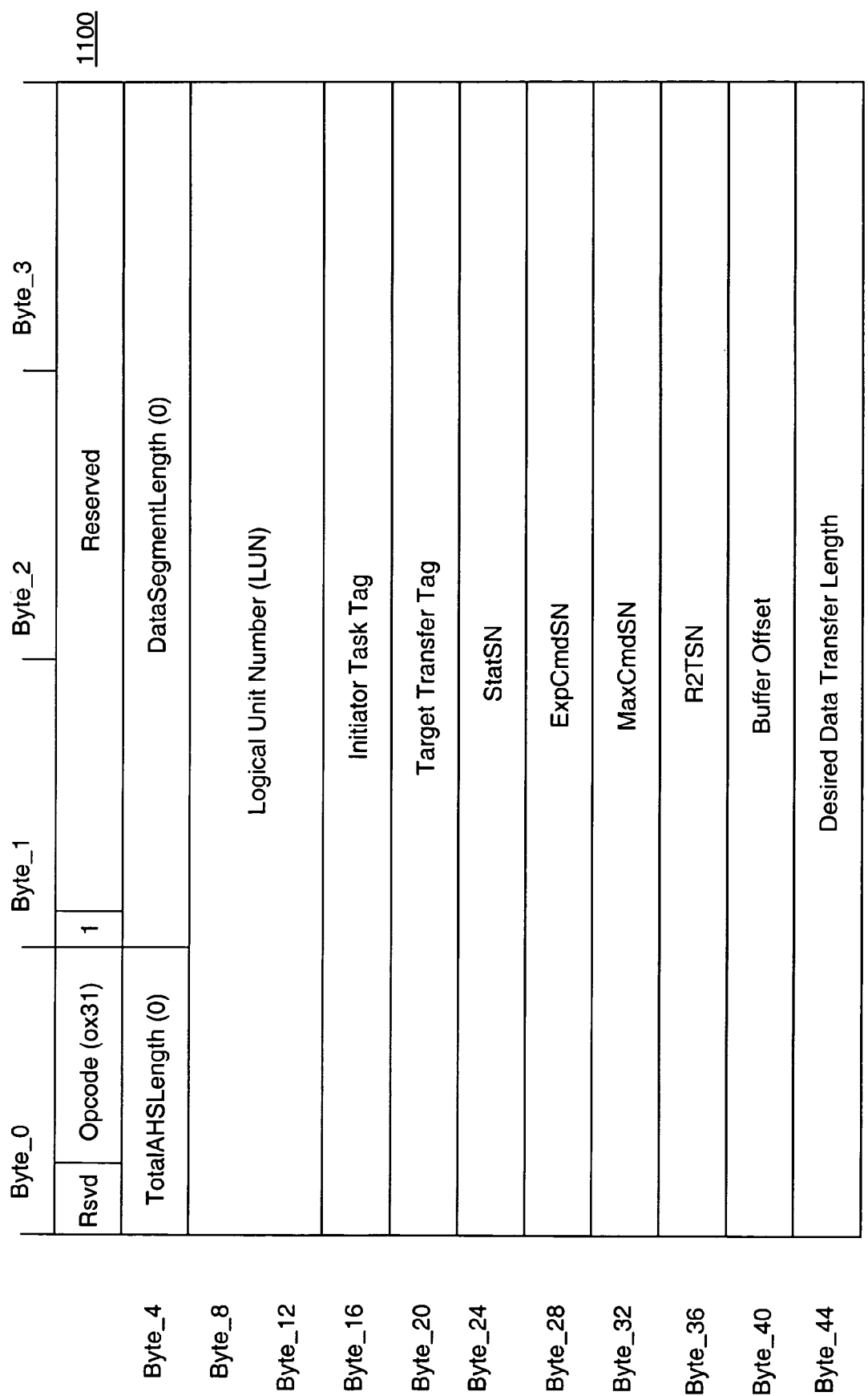
FIG. 11 illustrates a ready-to-transfer packet data unit in accordance with an embodiment of the present invention.

In response to a write command PDU 902 that specifies that no unsolicited data accompanies the command, the target allocates space in an appropriate input buffer for receiving the data and forms a message to be sent to the initiator including ready-to-transfer (R2T) PDU. FIG. 11 illustrates a R2T PDU 1100 in accordance with an embodiment of the present invention. The R2T PDU 1100 includes an R2T sequence number (R2TSN) field (byte_36 to byte_39), which is advanced for each R2T PDU sent in a series, a Buffer Offset field, which contains the starting transfer point from the beginning of total requested data, and a Desired Data Transfer Length field, the number of bytes solicited by this R2T. It also includes a Target Transfer Tag field that identifies the particular R2T PDU 1100 and a StatSN field that contains a next status sequence number. This field is not advanced after the R2T PDU 1100 is sent because the current PDU to the initiator does not contain a status field. Rather, the purpose of the StatSN number is to inform the initiator that all status response PDUs with a sequence number less than what is in the current StatSN field have been already sent. The initiator may send status SNACK PDUs to the target for requesting for retransmission of lost status response PDUs.

Upon receiving a R2T PDU 1100, the initiator segments the data specified by the R2T PDU 1100, encapsulates these data segments into data-out PDUs, and sends them to the target in Ethernet frames as described with reference to FIG. 5. For the data-out PDU's 1000 header for solicited data, both the LUN and Target Transfer Tag fields specify the same respective values as are specified in the referenced R2T PDU 1100.

As mentioned above, when data is solicited, the initiator first sends a write command PDU to the target. If the initiator does not receive R2T PDU's that it expects from the target the initiator may send an R2T SNACK PDU to request retransmission of the lost R2T. Again provision must be made for handling duplicated R2T PDUs.

Upon receiving the Ethernet frames that include the solicited data-out PDU's, the target performs error control using the CRC from the Ethernet frames and places the data segments in an input buffer for the specified LUN to which the data is to be written.

Preferably, a timer is set at the target after the target sends an R2T PDU 1100. If a data-out PDU solicited by the R2T PDU is not received before the expiration of the timer, the R2T PDU is sent again, until a maximum number of retries is reached.

If solicited or unsolicited data segments are missing at the target, e.g., because an Ethernet frame was dropped due to error, the target preferably requests retransmission of the missing data-out PDU. This may be accomplished by the target sending a new R2T PDU 1100 including an unused R2TSN value and including appropriate values in the Buffer Offset and Desired Data Transfer Length fields.

Similarly to a read operation, a hardware reconfiguration of the communication media 106 may result in duplicate data-out PDUs being sent for a write operation. For example, an Ethernet frame carrying a data-out PDU and corresponding data segment may be delayed such that the target requests retransmission of the data-out PDU. A second Ethernet frame including the same data segment may be sent in response to the request for retransmission. As a result, the target may eventually receive both the delayed frame and the resent frame. The target preferably discards a later-received data-out PDU to avoid attempting to process duplicate data.

Thus, read and write operations have been disclosed in which all packet data units (PDUs) including PDU headers and data segments are encapsulated in Ethernet data packets and without using TCP/IP protocol. It will be understood that these operations are exemplary and that other operations may be performed in the same manner in which a PDU is formed and encapsulated into an Ethernet frame prior to sending from an initiator to a target or from a target to an initiator. Such operations may include: copy, erase, status inquiry and so forth.

The above examples generally assume that a communication session exists between the target and the initiator. In certain circumstances, however, a session may need to be established. Further, in order to establish a communication session the initiator may need to have the Ethernet address of the target. Ethernet Address Resolution Protocol (ARP) provides a way of determining the Ethernet address of a network entity on the same Ethernet where the Internet address of the device is known in which the Internet address is generally acquired by supplying a device name to the name server. Because the present invention does not make use of TCP/IP, target devices in the system 100 (FIG. 1) will not be able to get an Internet addresses from a name server. Accordingly, this conventional Address Resolution Protocol will not generally be sufficient to determine the Ethernet address of the target.

In accordance with an embodiment of the present invention, a method is provided for establishing a communication session between initiator and target network entities. This may include determining the Ethernet address of a network entity.

Figure 12:
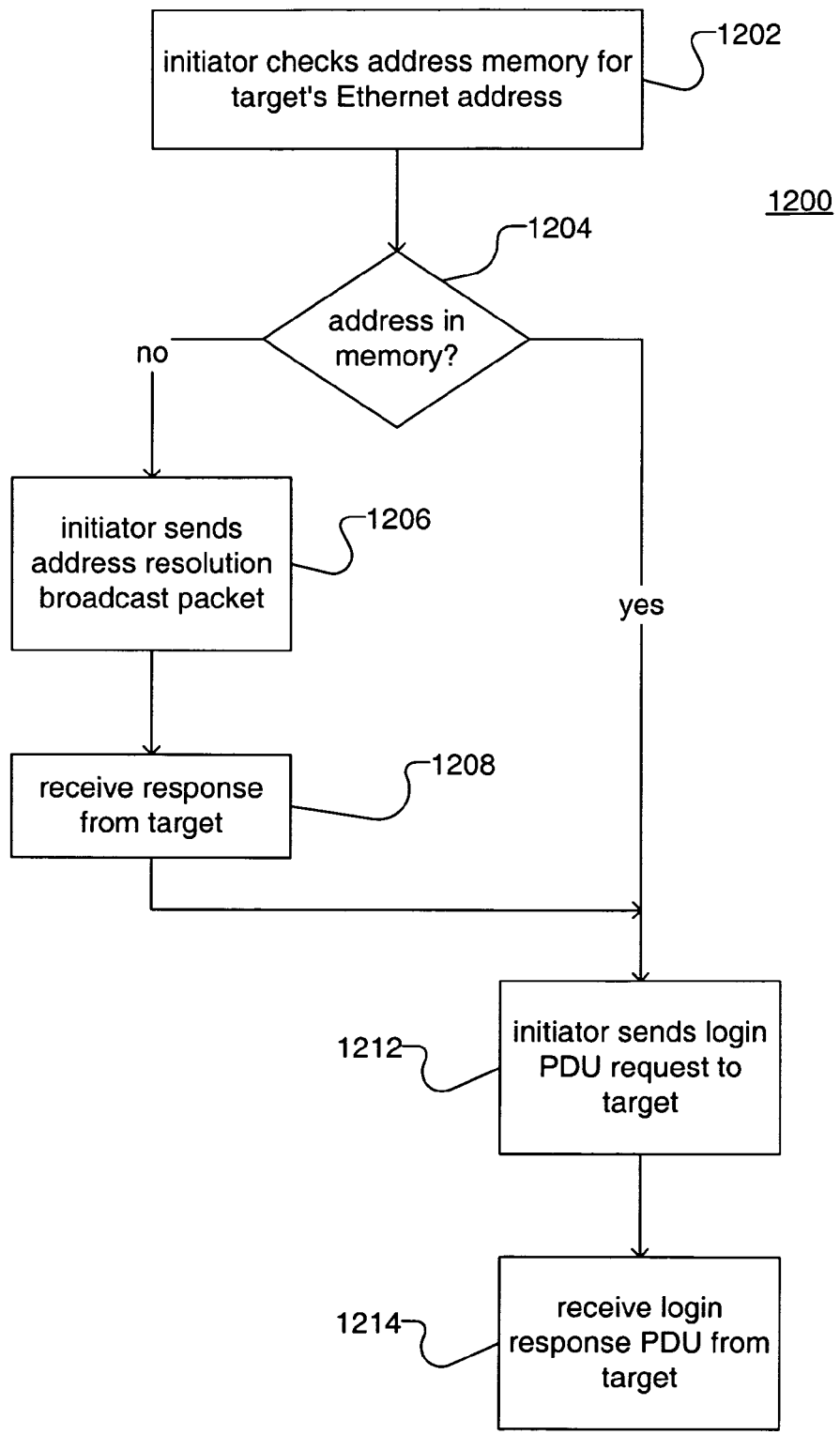
FIG. 12 illustrates a flowchart of a method for establishing a connection between an initiator and target in accordance with an embodiment of the present invention.

FIG. 12 illustrates a flowchart of a method 1200 for establishing a connection between an initiator and target in accordance with an embodiment of the present invention. In step 1202, the initiator checks its address memory for the target's Ethernet address. If the initiator does not already have the target's Ethernet address in its memory as determined in step 1204, this means that the initiator needs to obtain the target's Ethernet address. In this case, the initiator forms an address resolution broadcast packet that includes the name of the target, which can be in accordance with any naming scheme.

Figure 13:
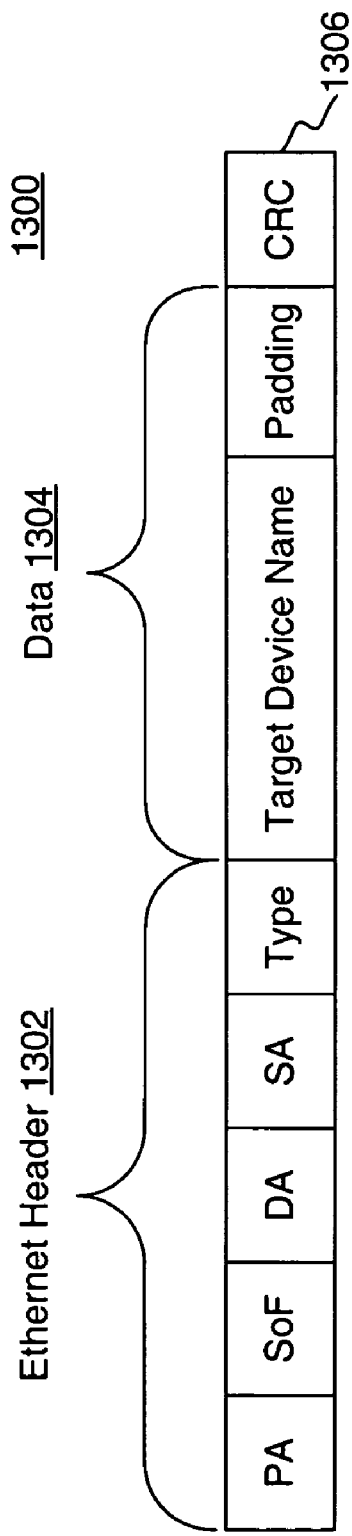
FIG. 13 illustrates a broadcast packet for discovery of an Ethernet address in accordance with an embodiment of the present invention.

FIG. 13 illustrates an address discovery broadcast packet 1300 for discovery of an Ethernet address in accordance with an embodiment of the present invention. As shown in FIG. 13, the packet 1300 includes an Ethernet header 1302, including a pre-amble (PA), a start-of-frame (SoF), a destination address (DA), a source address (SA), which is the Ethernet address of the initiator, and a type field, which identifies the packet as an address discovery request packet The packet 1300 also includes a data field 1304, in which the device name of the target is placed, padding, if needed, and a CRC 1306. The initiator then sends (i.e. broadcasts) the packet 1300 over the Ethernet communication media 102 (FIG. 1) to all of the other entities in the network.

All of the network devices that receive the packet 1300 determine from the type field that the packet 1300 is for address discovery request and also determine from the data field whether the packet 1300 is intended for them by comparing their own device name to the device name included in the packet. If there is a match (there should be no more than one match assuming each device has a unique device name), this means that recipient is the intended target.

Figure 14:
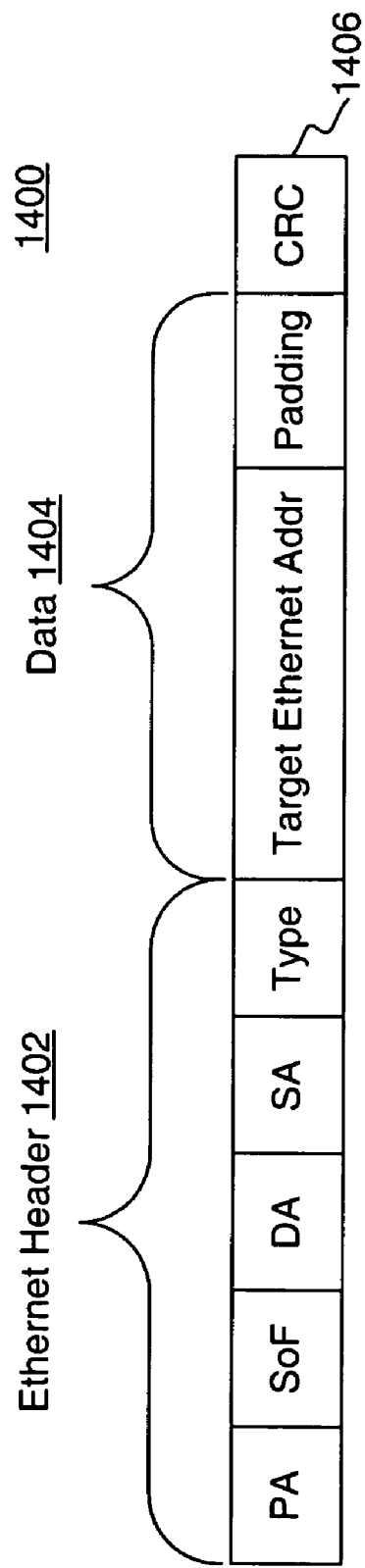
FIG. 14 illustrates a response packet to the broadcast packet of FIG. 11 in accordance with an embodiment of the present invention.

The intended target then forms a response packet. FIG. 14 illustrates an address discovery response packet 1400 in accordance with an embodiment of the present invention. As shown in FIG. 14, the packet 1400 includes an Ethernet header 1402, including a pre-amble (PA), a start-of-frame (SoF), a source address (SA), which is the Ethernet address of the target, a destination address (DA), which is the Ethernet address of the initiator and a type field, which identifies the packet as an address discovery reply packet. The packet 1400 also includes a data field 1404, in which the Ethernet address of the target is placed, padding, if needed, and a CRC 1406. The initiator then sends the packet 1400 over the Ethernet communication media 102 (FIG. 1) to the initiator.

The initiator receives the packet 1400 in step 1208 and obtains the target's Ethernet address from the packet. The initiator may then store the target's Ethernet address in its address memory in association with the target's device name for future use. As shown in FIG. 12, when the initiator already has the target's Ethernet address in its memory (as determined in step 1208), the step 1206 of sending the address discovery broadcast packet 1300 and the step 1208 of receiving an address discovery response packet 1400 can be skipped.

As described above, the type field for the packet 1300 is used to identify it as an address discovery request packet and the type field for the packet 1400 is used to identify it as address discovery reply packet. Where a new type is assigned to each, the data fields 1304 and 1404 respectively can have any formatting arrangement so long as they include the elements shown in FIGS. 13 and 14, respectively. In an alternate embodiment, the type field contains a value of 0806 hexadecimal (ox0806) indicating that the data fields have a predefined format, which is the same as for conventional Address Resolution Protocol, except that this conventional format is used in an inventive manner, as explained herein with reference to FIG. 15.

Figure 15:
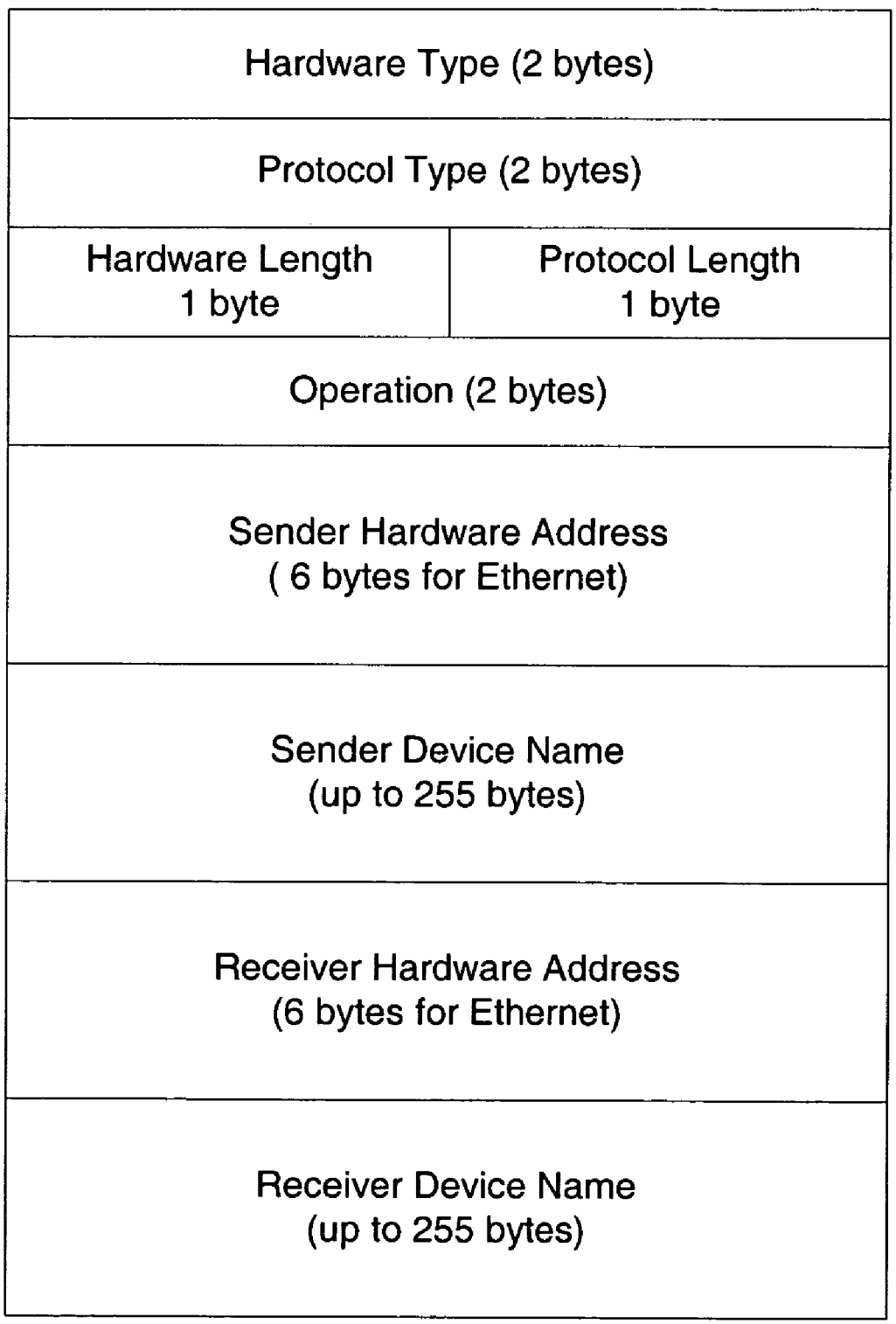
FIG. 15 illustrates an exemplary packet payload format for use for discovering an Ethernet address in accordance with an embodiment of the present invention.

FIG. 15 illustrates an exemplary packet payload format 1500 for use in discovering an Ethernet address in accordance with an embodiment of the present invention. The first two bytes is for the underlying network hardware identification; ox0001 is designated for Ethernet. The next two bytes is for identifying the higher layer protocol employing the network hardware. In the inventive application, the protocol is SCSI device name, and we use the same new number in the type field of Ethernet frames that are used for sending and receiving Ethernet SCSI PDU's. This is the same value used in the type field of FIGS. 4, 5 and 9 for example. The next field is a hardware address length field in bytes; for Ethernet, it has a value of 6. The next field is the protocol length field in bytes; it can have a maximum value of 255, which means the device name can be up to 256 bytes long. The next two bytes specifies the type of operation: 1 for ARP request, 2 for ARP reply, 5 for Device Name Discovery (DND) request, 6 for DND reply. The next four fields are self explanatory. During device address discovery, the initiator sends out a broadcast Ethernet frame with type field ox0806 (for ARP), and an ARP request message (operation type 1) with its own Ethernet address and device name in the sender hardware address and sender device fields respectively, and the target's device name in the receiver device name field. Upon receiving the request message, the target fills in the receiver hardware address field with its own Ethernet address, swaps the sender and receiver fields, and send an ARP response (operation type 2) to the initiator.

Device name discovery operates in a similar manner. The initiator sends out a broadcast Ethernet frame with type field ox0806 (for ARP), and a DND request message (operation type 5) with its own Ethernet address and device name in the sender hardware address and sender device fields respectively, and the target's Ethernet address in the receiver hardware address field. Upon receiving the request message, the target fills in the receiver device name field with its own device name, swaps the sender and receiver fields, and sends a DND reply (operation type 6) to the initiator.

Once the initiator has the target's Ethernet address, the initiator and the target perform connection establishing procedures, which may include mutual authentication, encryption keys exchange, and operating parameters negotiation by exchanging login request and response PDUs between the initiator and the target. A request is sent by the initiator to the target in step 1210. This may be accomplished by the initiator forming a login request PDU and encapsulating the login request PDU into an Ethernet frame in which the target Ethernet address is the destination address (DA) and the initiator's Ethernet address as the source address (SA). In addition, the same value in the type field as in FIGS. 4, 5 and 9 for the frame indicates that an eSCSI PDU in is the data field. The initiator then forwards the frame to the target.

The initiator then receives a response from the target in step 1212. More particularly, the target forms a login response PDU and encapsulates it in an Ethernet frame in the same way as the login request is encapsulated by the initiator, except that the values in the destination and source address fields are swapped.

Referring to FIG. 1, devices connected to a bridged Ethernet network can only communicate with devices outside the network through one or more IP routers which only forward IP packets. Therefore, all of the eSCSI PDUs are confined to the local bridged Ethernet network. With this added security, the authentication and encryption key exchange procedures may be omitted.

After the establishing a connection between the initiator and target, the initiator may send commands to the target and get responses from the target, as described herein.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of discovering an Ethernet address of a target device in a network having a plurality of devices, the method using a device name of the target device and comprising:
   forming a broadcast Ethernet packet including a source address field and a payload field, the source address field including an Ethernet address of an initiator and the payload field of the broadcast Ethernet packet including the device name;
   broadcasting the Ethernet packet over the network to each device in the network including the target device;
   ignoring the broadcast Ethernet packet at the devices other than the target device;
   receiving a response Ethernet packet from the target device, the response Ethernet packet including a destination address field, the destination address field including the Ethernet address of the initiator and the response Ethernet packet including the Ethernet address of the target device.

2. The method according to claim 1, wherein the response Ethernet packet includes a payload field, the payload field including the Ethernet address of the target device.

3. The method according to claim 2, wherein the response Ethernet packet includes a source address field, the source address field including the Ethernet address of the target device.

4. The method according to claim 1, further comprising checking an address memory and determining that the Ethernet address of the target device is not found in the address memory prior to forming the broadcast Ethernet packet.

5. The method according to claim 4, further comprising storing the Ethernet address of the target device in the address memory in association with the device name after receiving the response Ethernet packet.

6. The method according to claim 1, the broadcast Ethernet packet and the response Ethernet packet each including a type field, the type field including the value 0806 hexadecimal.

7. The method according to claim 1, the broadcast Ethernet packet and the response Ethernet packet each including a sender hardware address field, a sender device name field, a receiver hardware address field and a receiver device name field.

8. A method of establishing a connection between an initiator and a target device in a network having a plurality of devices, the initiator having an Ethernet address and the target device having an Ethernet address, the method comprising:
   checking an address memory for the Ethernet address of the target device;
   when the Ethernet address of the target device is not found in the address memory, performing steps of:
      forming a broadcast Ethernet packet including a source address field and a payload field, the source address field including the Ethernet address of the initiator and the payload field of the broadcast Ethernet packet including the device name of the target device;
      broadcasting the Ethernet packet over the network to each device in the network including the target device;
      ignoring the broadcast Ethernet packet at the devices other than the target device;
      receiving a response Ethernet packet from the target device, the response Ethernet packet including a destination address field, the destination address field including the Ethernet address of the initiator and response Ethernet packet including the Ethernet address of the target device; and
      storing the Ethernet address of the target device in the address memory in association with the device name of the target device;
   when the device name is found in the address memory, performing steps of:
      sending a login request from the initiator to the target device; and
      receiving a logic response from the target device at the initiator.

9. The method according to claim 8, wherein the response Ethernet packet includes a payload field, the payload field including the Ethernet address of the target device.

10. The method according to claim 9, wherein the response Ethernet packet includes a source address field, the source address field including the Ethernet address of the target device.

11. The method according to claim 8, the broadcast Ethernet packet and the response Ethernet packet each including a type field, the type field including the value 0806 hexadecimal.

12. The method according to claim 8, the broadcast Ethernet packet and the response Ethernet packet each including a sender hardware address field, a sender device name field, a receiver hardware address field and a receiver device name field.

13. A method of discovering a device name of a target device in a network having a plurality of devices, the method using an Ethernet address of the target device and comprising:
   forming a broadcast Ethernet packet including a source address field and a payload field, the source address field including an Ethernet address of an initiator and the payload field of the broadcast Ethernet packet including the Ethernet address of the target device;
   broadcasting the Ethernet packet over the network to each device in the network including the target device;
   ignoring the broadcast Ethernet packet at the devices other than the target device;
   receiving a response Ethernet packet from the target device, the response Ethernet packet including a destination address field and a payload field, the destination address field including the Ethernet address of the initiator and the payload field including the device name of the target device.

14. The method according to claim 13, wherein the response Ethernet packet includes a source address field, the source address field including the Ethernet address of the target device.

15. The method according to claim 13, further comprising checking an address memory and determining that the device name of the target device is not found in the address memory prior to forming the broadcast Ethernet packet.

16. The method according to claim 15, further comprising storing the device name of the target device in the address memory in association with the device name after receiving the response Ethernet packet.

17. The method according to claim 13, the broadcast Ethernet packet and the response Ethernet packet each including a type field, the type field including the value 0806 hexadecimal.

18. The method according to claim 13, the broadcast Ethernet packet and the response Ethernet packet each including a sender hardware address field, a sender device name field, a receiver hardware address field and a receiver device name field.

19. A computer readable memory comprising computer code for implementing a method of discovering an Ethernet address of a target device in a network having a plurality of devices, the method using a device name of the target device and comprising:
   forming a broadcast Ethernet packet including a source address field and a payload field, the source address field including an Ethernet address of an initiator and the payload field of the broadcast Ethernet packet including the device name;
   broadcasting the Ethernet packet over the network to each device in the network including the target device, wherein the broadcast Ethernet packet is ignored at the devices other than the target device; and
   receiving a response Ethernet packet from the target device, the response Ethernet packet including a destination address field, the destination address field including the Ethernet address of the initiator and the response Ethernet packet including the Ethernet address of the target device.

* * * * *